United States Patent [19]

Albin et al.

[11] Patent Number: 4,762,891
[45] Date of Patent: Aug. 9, 1988

[54] SCORCH-RESISTANT, CURABLE FLUORINATED ELASTOMER

[75] Inventors: Loren D. Albin, Oakdale; Robert E. Kolb, St. Paul, both of Minn.

[73] Assignee: Minnesota Mining and Manufacturing Company, St. Paul, Minn.

[21] Appl. No.: 14,300

[22] Filed: Feb. 13, 1987

[51] Int. Cl.⁴ ............................................. C08L 27/22
[52] U.S. Cl. .................................. 525/276; 525/291; 525/348; 525/326.3
[58] Field of Search .................... 525/276, 291, 348

[56] References Cited

U.S. PATENT DOCUMENTS

| | | | |
|---|---|---|---|
| 2,968,549 | 1/1961 | Brady | 75/126 |
| 2,968,649 | 1/1961 | Pailthorp et al. | 260/80.5 |
| 3,051,677 | 8/1962 | Rexford | 260/29.6 |
| 3,318,854 | 5/1967 | Honn et al. | 260/87.7 |
| 3,538,028 | 11/1970 | Morgan | 260/23 |
| 4,035,565 | 7/1977 | Apotheker et al. | 526/249 |
| 4,214,060 | 7/1980 | Apotheker et al. | 525/387 |
| 4,243,770 | 1/1981 | Tatemoto et al. | 525/331 |
| 4,263,414 | 4/1981 | West | 525/102 |
| 4,287,320 | 9/1981 | Kolb | 525/340 |
| 4,450,263 | 5/1984 | West | 526/249 |
| 4,501,866 | 2/1985 | Roggeman et al. | 526/133 |
| 4,550,132 | 10/1985 | Capriotti | 524/84 |
| 4,564,662 | 1/1986 | Albin | 526/247 |
| 4,595,720 | 6/1986 | Stivers et al. | 524/100 |

OTHER PUBLICATIONS

West, A. C. and Holcomb, A. G., "Fluorinated Elastomers", Kirk–Othmer, *Encyclopedia of Chemical Technology*, vol. 8, pp. 500–515 (3rd ed., John Wiley & Sons, 1979).

*Primary Examiner*—Carman J. Seccuro
*Attorney, Agent, or Firm*—Donald M. Sell

[57] ABSTRACT

A scorch-resistant, curable, fluorinated elastomer gum composition is provided. A free-radically curable, fluorinated elastomer gum is compounded with an aliphatically unsaturated, diorganosulfur compound in which at least one of the organo moieties contains a $\beta,\gamma$-aliphatically unsaturated moiety having at least one hydrogen atom bonded to the $\alpha$ carbon atom of said moiety, said carbon atom being bonded to a sulfur atom of the compound. The diorganosulfur compound reduces the tendency of the compounded fluorinated elastomer gum to scorch, i.e. begin curing prematurely, in the presence of a free-radical curing agent during compounding and shaping of the gum at elevated temperatures below the intended cure temperature. Specific examples of said compounds include 2,5-dihydrothiophene-1,1-dioxide, 2,5-dihydrothiophene-1-oxide, and diallylsulfide. Methods of compounding a fluorinated elastomer gum composition and of shaping and curing such a composition to obtain a fluorinated elastomeric article are also provided.

25 Claims, No Drawings

SCORCH-RESISTANT, CURABLE FLUORINATED ELASTOMER

This invention relates to fluorinated elastomer gum compositions which in admixture with a curing system are useful in preparing shaped articles of cured fluorinated elastomers. In another aspect, this invention relates to methods of compounding and curing such compositions.

Fluorinated elastomers are known types of synthetic elastomers— see, for example, West, A. C. and Holcomb, A. G., "Fluorinated Elastomers", Kirk-Othmer, *Encyclopedia of Chemical Technology,* Vol. 8, pp. 500–515 (3rd ed. John Wiley & Sons, 1979). Fluorinated elastomer gums can be compounded and cured (or vulcanized) to produce fluorinated elastomer articles and coatings having excellent heat and chemical resistance, e.g., automotive and industrial seals, diaphragms, flue duct coatings, and hose.

The curing of fluorinated elastomers is generally accomplished by one of three different cure systems. One commonly used cure system is a cure system which is incorporated, or milled, into the fluorinated elastomer gum and comprises an organo-onium cure accelerator, e.g. triphenylbenzylphosphonium chloride, and a polyphenol crosslinking agent, e.g. hexafluoroisopropylidenediphenol. U.S. Pat. No. 4,287,320 (Kolb) discloses curing of fluorinated elastomer gums with quaternary phosphonium or ammonium accelerators and aromatic hydroxy or amino crosslinking agent. Said patent discloses saturated diorganosulfur oxides which can be used to increase the rate of cure of the fluorinated elastomer gum.

In the other two cure systems, diamines or peroxides and coagents are generally mixed with fluorinated elastomer gums by the rubber molder during compounding of the fluorinated elastomer gum with whatever fillers and additives the rubber molder may desire. Diamine cure systems are disclosed, for example, in U.S. Pat. No. 3,538,028 (Morgan). Peroxide cure systems, which effect cure of fluorinated elastomers made with cure-site monomers through a free-radical mechanism initiated by the peroxide, are disclosed, for example, in U.S. Pat. Nos. 4,214,060 (Apotheker et al.), 4,450,263 (West), 4,564,662 (Albin) and 4,550,132 (Capriotti). The latter patent discloses as processing aids for peroxide-curable fluorinated elastomer copolymer the use of tetramethylene sulfone (i.e., 2,3,4,5-tetrahydro-thiophene-1,1-dioxide), 4,4'-dichlorodiphenyl sulfone, dimethyl sulfone, or tetramethylene sulfoxide (i.e., 2,3,4,5-tetrahydro-thiophene-1-oxide). That patent also discloses that tetramethylene sulfone maintains or improves the tensile strength and compression set resistance of the cured fluorinated elastomer.

Fluorinated elastomer gums, combined with conventional fillers, acid acceptors, stabilizers, and other adjuvants, are shaped into useful articles by such procedures as milling, molding, and extrusion. These operations require good flow and relatively stable viscosity for a period of time at temperatures typically of about 250° F. (120° C.) sufficient to facilitate compounding and shaping processing steps, and require rapid cure after a short time at temperatures typically of about 350° F. (177° C.). However, premature curing at the lower compounding and processing temperatures often occurs, resulting in, for example, "poor knitting" (i.e., a failure to form a single coherent mass) in complex molds and distorted flow in extrusion. Formulations exhibiting this type of premature cure are termed "scorchy" in the art, a term frequently applied to the peroxide-cure fluorinated elastomer system. As used herein, "scorch" or "scorchy" will refer to an undesirable rise in the viscosity of the compounded, curable fluorinated elastomer when heated during processing to a temperature below its intended cure temperature.

It has now been found that mixing or compounding of certain organic sulfur compounds with free-radically curable fluorinated elastomer gum formulations, such as a peroxide-curable fluorinated elastomer formulation, allows extended time for flow of the gum formulation under processing conditions with satisfactory cure rates and states of cure. Accordingly, milling speeds can be improved, molds can be more complicated, generally the desired quality of the molded and extruded articles can be improved, and the desired physical properties of the cured articles are maintained or not adversely affected.

Briefly, in one aspect, this invention relates to a fluorinated elastomer composition comprising fluorinated elastomer gum and, as a scorch inhibitor, an aliphatically unsaturated, diorganosulfur compound in which at least one of the organo groups contains a $\beta,\gamma$-aliphatically unsaturated moiety having at least one hydrogen atom bonded to the $\alpha$ carbon atom of the moiety, said carbon atom being bonded to a sulfur atom of the compound. Such compounds are occasionally referred to hereinafter as diorganosulfur compounds or scorch inhibitors for purposes of brevity. An example of said unsaturated moiety is —C≡C—CH— and examples of such compounds are diallylsulfide and 2,5-dihydrothiophene-1,1-dioxide. The sulfur atom can be present in the form of thio, —S—, sulfinyl, —SO—, or sulfonyl, —SO$_2$—. "Aliphatically unsaturated" is used in its usual sense, i.e. containing less hydrogen than the corresponding saturated aliphatic counterpart, e.g., olefinic or acetylenic unsaturation.

In another aspect, this invention relates to a method of compounding a fluorinated elastomer gum composition, said method comprising mixing with a fluorinated elastomer gum, said diorganosulfur compound. When a thermally-activatable, free-radical curing agent or system is also mixed with the fluorinated elastomer gum, the mixture is curable and can be used to form a cured fluorinated elastomeric article. In yet another aspect, this invention relates to a method of forming a fluorinated elastomeric article, said method comprising (a) compounding a fluorinated elastomer gum with a free-radical curing system and said diorganosulfur compound, (b) shaping said composition, for example, by molding or extrusion, generally at an elevated temperature (e.g. above about 125° C.), to form a shaped article, and (c) heating the shaped article to cure the same.

A class of the scorch inhibitors of this invention are represented by the formula R$^1$—S(O)$_n$—R$^2$ wherein n is 0, 1 or 2 and R$^1$ and R$^2$ are organic groups (preferably aliphatic, either cyclic or acyclic) at least one of which contains a $\beta,\gamma$-aliphatically unsaturated moiety having at least one hydrogen atom bonded to the $\alpha$ carbon atom of said moiety, said carbon atom being bonded to a sulfur atom of the compound. R$^1$ and R$^2$ can be covalently bonded to each other to form a heterocyclic ring. The sum of the carbon atoms of R$^1$ and R$^2$ is preferably at least four. Such diorganosulfur compounds are acyclic compounds, such as diallylsulfide and diallylsulfone, carbocyclic compounds such as allyl cyclohexyl sulfoxide, and heterocyclic compounds.

Examples of the heterocyclic diorganosulfur compounds are represented by the structural formula:

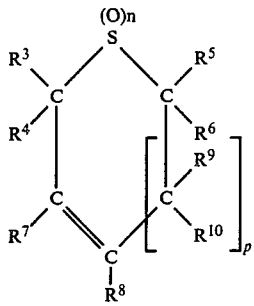

wherein n is 0, 1, or 2, p is 0 or 1, and each R in said structural formula is independently selected from the group consisting of hydrogen and alkyl (preferably a lower alkyl with 1 to 6 carbon atoms) and at least one of $R^3$, $R^4$, $R^5$ and $R^6$ is hydrogen. Examples of these heterocyclic sulfur oxides include 2,5-dihydrothiophene-1,1-dioxide, 3-methyl-2,5-dihydrothiophene-1,1-dioxide, and 3-ethyl-2,5-dihydrothiophene-1,1-dioxide.

One or a mixture of the diorganosulfur compounds or scorch inhibitors are compounded or milled into the fluorinated elastomer gum in an amount sufficient to inhibit the scorch of the gum when the gum is compounded with free-radical curing systems at elevated temperatures, e.g. the temperatures conventionally encountered or used during compounding, molding, or extruding fluorinated elastomers. In general, amounts of scorch inhibitor will range between about 0.05% to about 10%, preferably about 0.1% to about 5%, by weight of the fluorinated elastomer gum. The scorch inhibitors are preferably compounded into the gum along with the curing system, or prior to the compounding of the gum with the curing system, to ensure maximum scorch inhibition.

The fluorinated elastomer gums useful in this invention are known in the art and are generally described, for example, by West, A. C. and Holcomb, A. G. "Fluorinated Elastomers", Kirk-Othmer, *Encyclopedia of Chemical Technology*, vol. 8, pp. 500–515 (3rd ed., John Wiley & Sons, NY, NY, 1979), the description of which gums is incorporated herein by reference. To exhibit the characteristic chemical resistance and thermal stability, the elastomer gums contain at least about 30% by weight of fluorine and preferably at least about 50%.

Preferred fluorinated elastomer gums useful in this invention are peroxide-curable fluorocarbon elastomers which are copolymers of fluorinated olefins and a cure-site monomer such as those containing a bromine or iodine atom. A preferred class of such fluorocarbon elastomers is the elastomeric copolymers of (a) vinylidene fluoride, (b) at least one terminally unsaturated comonomer containing at least as many fluorine atoms as carbon atoms, each carbon atom of said comonomer being substituted only with fluorine, chlorine, hydrogen, or lower fluoroalkoxy radical, particularly comonomers such as hexafluoropropene, tetrafluoroethylene, perfluoromethyl perfluorovinyl ether, and 1-hydropentafluoropropene, and (c) a cure-site monomer which is fluorinated or non-fluorinated and has at least one bromine or iodine atom. Those copolymers are described in U.S. Pat. Nos. 4,214,060 and 4,564,662, cited above. An alternative to incorporating a cure-site monomer is the use of a bromo- or iodo-functional, chain-transfer agent in the polymerization of the fluorinated monomers, as disclosed in U.S. Pat. No. 4,501,866 (Roggeman et al.) and U.S. Pat. No. 4,243,770 (Tatemoto et al.) Another preferred class of peroxide-curable fluorocarbon elastomers used in this invention is that made by copolymerizing a cure-site monomer with tetrafluoroethylene and a perfluoroalkyl perfluorovinyl ether such as perfluoromethyl perfluorovinyl ether. Fluorinated elastomers which also can be used are those produced by copolymerizing vinylidene fluoride with a fluorine-containing olefin and optionally perfluoroalkyl perfluorovinyl ether, such as the vinylidene fluoride/hexafluoropropene copolymer described in U.S. Pat. Nos. 3,051,677 (Rexford) and 3,318,854 (Honn et al), with, if desired, a cure-site monomer incorporated in the polymerization. Other fluorocarbon elastomers that can be used include copolymers produced by copolymerizing vinylidene fluoride, hexafluoropropene and tetrafluoroethylene as described in U.S. Pat. No. 2,968,649 (Pailthorp et al.), and, if desired, incorporating a cure-site monomer in the polymerization.

The most preferred fluorocarbon elastomers used in this invention are those based on vinylidene fluoride as the major component combined with (a) at least one other copolymerizable fluoroolefin having two to five carbon atoms and at least one fluorine atom for each carbon atom, and (b) a small amount, on a molar basis, of a copolymerizable bromine- or iodine-containing cure-site monomer, e.g. cure-site fluoro-olefins and vinyl ethers, such as those described in U.S. Pat. Nos. 4,214,060, 4,450,263 and 4,564,662. The copolymers will usually contain 60 to 85 mol % vinylidene fluoride ($VF_2$), 15 to 40 mol % perfluoropropene (HFP), and 0.15 to 3 mol % bromine or iodine-containing cure-site monomer. While up to 30 mol of other fluoroolefins, particularly tetrafluoroethylene, can be used, the only three monomers necessary in these most preferred fluorinated elastomers are $VF_2$, HFP and a bromine- or iodine-containing cure-site monomer. A preferred composition is 65 to 82 mol % $VF_2$, 17 to 35 mol % HFP, and 0.2 to 0.6 mol % bromine-containing cure-site monomer.

The preferred fluorocarbon elastomers useful in this invention can be prepared by known high pressure, free-radical polymerization techniques generally used to prepare fluorocarbon elastomers such as vinylidene fluoride/hexafluoropropene polymers, those techniques being described, for example, by West and Holcomb, supra, and in said U.S. Pat. No. 4,035,565. Briefly, the fluoropolymers are prepared by charging a pressure reactor with reaction diluent, pH buffer, emulsifier, initiator, cure-site monomer, and principal comonomers; carrying out the emulsion polymerization of the charge at constant elevated temperature, e.g., 25° to 125° C., and pressure, e.g., 0.5 to 10 MPa with agitation; coagulating the resulting polymer; and filtering, washing, and drying the resulting fluorocarbon elastomer gum.

The fluorinated elastomer gum-scorch inhibitor compositions of this invention can be cured by heating them in the presence of a thermally-activatable free-radical curing system. Such systems are generally comprised of a thermally-activatable, free-radical curing agent and a co-curing agent. Preferred free-radical curing agents are organic peroxides such as benzoyl peroxide, bis(2,4-dichlorobenzoyl)peroxide, dicumyl peroxide, t-butyl hydroperoxide, di-t-butyl peroxide, t-butylperoxy benzoate, and lauroyl peroxide. Particularly useful commercially available peroxides are 2,5-dimethyl-2,5-bis(t-butylperoxy)hexane and 2,5-dimethyl-2,5-bis(t-butylperoxy) hexyne-3 which are the active ingredients of products sold as "Luperco" 101XL and 130XL, respectively. The amount of peroxide curing agent to be mixed with the fluorinated elastomer gum, e.g., on a two-roll mill, in a Banbury mixer, or in a mixing extruder, generally will be 0.1 to 10, preferably 1 to 5, parts per 100 parts of the fluorinated elastomer gum.

Along with the peroxide curing agent, there is incorporated in or compounded with the gum a co-curing agent (or co-agent), such as is commonly used in peroxide vulcanization of fluorinated elastomers to obtain a tighter cure or better compression set. Such co-curing agents generally will be used in amounts of 0.1 to 10, preferably 1 to 5, parts per 100 parts of the fluorinated elastomer gum. Examples of co-curing agents which can be used include triallyl cyanurate, diallyl phthalate, allyl methacrylate, trimethallyl isocyanurate and, particularly, triallyl isocyanurate.

In many cases, for optimum fluorinated elastomer physical properties, such as tensile strength, it will be desirable to include in the compounding formulation a reinforcing filler such as carbon black, silica, iron oxide, or zinc oxide, e.g. 5 to 60 parts by weight per 100 parts weight of the fluorinated elastomer gums (as described in said U.S. Pat. No. 4,263,414). Processing aids, such as isocyanurate or cyanurate derivatives as described in U.S. Pat. No. 4,595,720 (Stivers et al.) and organic sulfones as described in U.S. Pat. No. 4,550,132 (Capriotti), can also be included in the fluorinated elastomer compositions. The fluorocarbon elastomer gum can be banded on a two-roll mill and the compounding adjuvants can then be milled in individually or as a mixture.

In making the shaped fluorinated elastomer articles, the compounded, vulcanizable mixture is generally extruded or molded in a cavity or transfer mold at a temperature in the range of 125° to 250° C. for 1 to 50 minutes or more at about 5 to 10 MPa. The extruded or press-cured article can then be transferred to a circulating air oven and post-cured at about 170° to 260° C. for about 2 to 24 hours, preferably at about 230° C. for 16 hours, yielding cured (that is, crosslinked or vulcanized) shaped articles which are elastomeric (i.e., materials which, when slowly stretched at room temperature to at least twice their original length and released, return rapidly to essentially their original length).

The curable fluorinated elastomer composition of this invention can be employed in making molded or extruded articles of manufacture, such as gaskets, O-rings, diaphragms, tubing, ducting, carburetor fuel tips, fuel pump cups, shaft seals, and other molded or extruded goods. The particular application will usually be determined by the properties of the cured polymer, the requirements of such applications being well known and described, for example, in the prior art publications described hereinbefore.

Objects and advantages of this invention are illustrated in the following examples.

EXAMPLES 1-6 AND COMPARATIVE EXAMPLE A

These examples show the typical improvement in cure characteristics of this invention. The ingredients of the formulation are listed in Table 1 and were compounded and the compound formulation was molded and cured by standard procedures. The fluorocarbon elastomer gum is a copolymer of about 80 mole % vinylidene fluoride, about 20 mole % of hexafluoropropylene and about 0.3 mole % 1,1-difluoro-2-bromoethylene (said polymer being 66% fluorine by weight). The carbon black is available from J. M. Huber Corp. as "Thermax" N-990. The peroxide curative is a 45% active preparation of 2,5-dimethyl-2,5-di-(t-butyl-peroxy)hexane absorbed in calcium carbonate and is available from Pennwalt Corp. as "Luperco" 101XL. The amounts in Table 1 are parts by weight (pbw).

TABLE 1

| Ingredient | Amount (pbw) |
| --- | --- |
| Fluorocarbon elastomer gum | 100 |
| Carbon black | 30 |
| Triallylisocyanurate | 2.5 |
| Peroxide curative | 2.5 |
| Calcium hydroxide | 3 |
| Organosulfur compound | variable (see Table 2) |

Resistance to scorch of the compounded formulation is reported under the heading "Mooney scorch". Data were obtained in accordance with ASTM D1646-74 using a Scott Testing Inc. Mooney Viscometer Model ST1, with a 1 minute preheat and a small rotor at 121° C. A curable elastomer formulation is considered herein to have good resistance to scorch or to be "non-scorchy" if it has less than about 1 N.m torque or viscosity rise in 60 minutes.

Curing characteristics of the compounded formulation are reported under the heading "Cure rheology". Data were obtained in accordance with ASTM D2084-75 using a Monsanto Oscillating Disk Rheometer Model MP-V, using a small disk, a 100 cpm oscillator frequency, and a 3° arc.

The press-cured sheets, 150 mm×2 mm, and O-rings, 15 mm diameter, 3.5 mm thick, were pressed at about 7 MPa for 15 minutes at 177° C. The post-cured articles were then removed from the press and placed for 16 hours in a circulating air oven having a temperature maintained at 230° C. Tensile strength, elongation at break, and modulus at 100 percent elongation were measured in accordance with ASTM D412-80, using Die D. Hardness was measured in accordance with ASTM D2240-75, using Durometer A and taking readings 2 seconds after the presser foot came into contact with the specimen.

Table 2 shows the identity and amount of scorch inhibitor and the resulting physical properties of the compounded gum and cured fluorocarbon elastomer.

The improvement of the invention over the performance shown by the control (Comparative Example A) containing no diorganosulfur compound is clear from Table 2. For example, the Mooney scorch test results of Comparative Example A show this formulation to be "scorchy", i.e., it has a 1.13 N.m torque or viscosity rise in 28 minutes. In contrast, the formulations of this invention had much slower viscosity increases, Example 1 requiring 93 minutes for 1.3 N.m rise. In Examples 2-5, there was no viscosity rise in 60 minutes, and in Example 6 there was no viscosity rise in 120 minutes. This improvement in scorch resistance is coupled with a satisfactory cure rate at 177° C. (350° F.) about the same as the control, the physical properties of the cured sample of Example 1 being comparable to those properties of the cured sample of the control.

TABLE 2

| | Comp. Ex. A* | Ex. 1 | Ex. 2 | Ex. 3 | Ex. 4 | Ex. 5 | Ex. 6 |
|---|---|---|---|---|---|---|---|
| Diorganosulfur compound, pbw | | | | | | | |
| 2,5-dihydrothiophene-1,1-dioxide | | 0.2 | 0.5 | | | | |
| 3-methyl-2,5-dihydrothiophene-1,1-dioxide | | | | 0.28 | 0.56 | | |
| 3-ethyl-2,5-dihydrothiophene-1,1-dioxide | | | | | | 0.31 | 0.62 |
| Mooney scorch (MS + 1 @ 121° C.) | | | | | | | |
| Minimum torque (N · m) | 4.74 | 5.19 | 4.7 | 5.19 | 4.97 | 4.97 | 4.97 |
| Time to 1.13 N · m rise (min) | 28 | 93 | >120 | >120 | >120 | >120 | >120 |
| N · m rise in 25 min | 0.67 | 0 | 0 | 0 | 0 | 0 | 0 |
| N · m rise in 60 min | 2.71 | 0.45 | 0 | 0 | 0 | 0 | 0 |
| N · m rise in 90 min | 4.18 | 1.0 | 0.11 | 0.22 | 0 | 0.34 | 0 |
| N · m rise in 120 min | 5.19 | 1.8 | 0.22 | 0.68 | 0.22 | 0.56 | 0 |
| Cure rheology, Monsanto ODR, 177° C., microdisk, 3° arc, 100 cpm | | | | | | | |
| Minimum torque (N · m) | 1.92 | 1.81 | 1.58 | 1.69 | 1.46 | 1.81 | 1.46 |
| Time to 0.23 N · m rise (min) | 1.5 | 2.0 | 3.3 | 2.0 | 5.0 | 2.0 | 5.0 |
| Time to 50% max. torque (min) | 3.0 | 4.2 | 5.2 | 4.1 | 7.4 | 4.1 | 7.4 |
| Time to 90% max. torque (min) | 6.7 | 7.0 | 8.9 | 7.9 | 10.1 | 7.5 | 10.1 |
| Maximum torque (N · m) (12 min) | 8.25 | 8.58 | 7.23 | 8.25 | 5.08 | 7.79 | 5.08 |
| Physical properties of cured articles | | | | | | | |
| Tensile strength, MPa | 16.22 | 15.54 | — | — | — | — | — |
| Elongation, % | 251 | 240 | — | — | — | — | — |
| Modulus, (MPa at 100% elongation) | 3.43 | 4.30 | — | — | — | — | — |
| Shore A Hardness | 71 | 72 | — | — | — | — | — |

*In Comparative Example A, no diorganosulfur compound was used

EXAMPLES 7–10 AND COMPARATIVE EXAMPLES B AND C

In another series of examples using the formulation of Table 1, Examples 8–10 of this invention were compared to Comparative Examples B and C wherein the formulation included no organosulfur compound and a saturated organosulfur oxide (i.e., sulfolane) respectively. The identity and amounts of the organosulfur oxide and the properties of the resulting formulations are shown below in Table 3.

Example C. The results also show satisfactory cure rates and state of cure were obtained on the compositions of this invention, Examples 7–10.

EXAMPLE 11 AND COMPARATIVE EXAMPLES D–H

In another series of examples using the formulations of Table 1, Example 11 of this invention was compared to Comparative Examples D–H where the formulation either contained no organosulfur compound (Comparative Ex. D) or organonsulfur compounds (Comparative

TABLE 3

| | Comp. Ex. B* | Comp. Ex. C | Ex. 7 | Ex. 8 | Ex. 9 | Ex. 10 |
|---|---|---|---|---|---|---|
| Organosulfur compound, pbw | | | | | | |
| 2,3,4,5-tetrahydrothiophene-1,1-dioxide | | 0.5 | | | | |
| 2,5-dihydrothiophene-1,1-dioxide | | | 0.25 | 0.5 | | |
| 2,5-dihydro-thiophene-1-oxide | | | | | 0.43 | |
| diallylsulfide | | | | | | 0.47 |
| Mooney scorch (MS + 1 @ 121° C.) | | | | | | |
| Minimum torque (N · m) | 4.74 | 4.29 | 5.19 | 4.74 | 4.52 | 4.74 |
| Time to 1.13 pts rise (min) | 28 | 42 | 92 | >120 | >120 | 120 |
| N · m rise in 25 min | 0.68 | 0.45 | 0 | 0 | 0 | 0 |
| N · m rise in 60 min | 2.7 | 2.26 | 0.45 | 0 | 0 | 0.23 |
| N · m rise in 90 min | 4.18 | 3.6 | 1.0 | 0.11 | 0.11 | 0.68 |
| N · m rise in 120 min | 5.2 | 5.2 | 1.8 | 0.23 | 0.34 | 1.1 |
| Cure rheology, Monsanto ODR, 177° C. microdisk, 3° arc, 100 cpm | | | | | | |
| Minimum torque (N · m) | 1.92 | 1.58 | 1.80 | 1.58 | 1.69 | 2.03 |
| Time to 0.23 N · m rise (min) | 1.5 | 1.6 | 2.0 | 3.3 | 2.6 | 1.9 |
| Time to 50% max torque (min) | 3.0 | 3.0 | 4.2 | 5.2 | 5.2 | 4.0 |
| Time to 90% max torque (min) | 6.7 | 6.6 | 7.0 | 8.9 | 9.05 | 7.0 |
| Maximum torque (N · m) (12 min) | 8.24 | 7.68 | 8.58 | 7.23 | 4.52 | 8.47 |

*In Comparative Example B, no organosulfur compound was used.

The results shown in Table 3 illustrate a marked reduction in scorch obtained in Examples 7–10 as compared with Comparative Example B and Comparative Ex. E–H) which are not scorch inhibitors of this invention. These examples and the results are summarized in Table 4.

TABLE 4

| | Comp. Ex. D* | Comp. Ex. E | Comp. Ex. F | Comp. Ex. G | Comp. Ex. H | Ex. 11 |
|---|---|---|---|---|---|---|
| Organosulfur compound, pbw | | | | | | |
| 2,3,4,5-tetrahydrothiophene-1-oxide | | 0.44 | | | | |
| 3-methyl-2,4,5-trihydrothiophene-1,1-dioxide | | | 0.57 | | | |
| 2,2,5,5-tetramethylthiophene-1,1-dioxide | | | | 0.73 | | |

TABLE 4-continued

|  | Comp. Ex. D* | Comp. Ex. E | Comp. Ex. F | Comp. Ex. G | Comp. Ex. H | Ex. 11 |
|---|---|---|---|---|---|---|
| dibenzyl sulfoxide |  |  |  |  | 0.97 |  |
| 2,5-dihydrothiophene-1,1-dioxide |  |  |  |  |  | 0.5 |
| Mooney scorch (MS + 1 @ 121° C.) |  |  |  |  |  |  |
| Minimum torque (N · m) | 4.7 | 5.0 | 4.3 | 4.3 | 4.1 | 4.74 |
| Time to 1.13 N · m rise | 28 | 38 | 36 | 35 | 42 | >120 |
| N · m rise in 25 min | 0.68 | 0.23 | 0.23 | 0.34 | 0.11 | 0 |
| N · m rise in 60 min | 2.7 | 1.9 | 2.0 | 2.1 | 1.6 | 0 |
| N · m rise in 90 min | 4.2 | 2.5 | 3.1 | 3.3 | 2.3 | 0.11 |
| N · m rise in 120 min | 5.2 | 3.2 | 4.3 | 4.7 | — | 0.23 |
| Cure rheology, Monsanto ODR, 177° C., microdisk, 3° arc, 100 cpm |  |  |  |  |  |  |
| Minimum torque (N · m) | 1.9 | 1.9 | 1.8 | 1.7 | 1.4 | 1.6 |
| Time to 0.23 N · m rise (min) | 1.5 | 1.7 | 1.7 | 1.4 | 1.6 | 3.3 |
| Time to 50% max torque (min) | 3.1 | 3.0 | 3.0 | 2.9 | 3.4 | 5.2 |
| Time to 90% max torque (min) | 6.7 | 6.6 | 6.6 | 6.0 | 5.1 | 8.9 |
| Maximum torque (N · m) (12 min) | 8.25 | 8.1 | 8.2 | 7.5 | 5.6 | 7.23 |

*Comparative Example D contained no organosulfur compound.

Table 4 shows the marked reduction in scorch achieved by a formulation of this invention (Example 11) as compared to formulations containing other organosulfur compounds. In particular, Comparative Example G illustrates the importance of having a hydrogen atom on the α carbon atom of the β,γ-aliphatically unsaturated moiety, which carbon atom is bonded to the S atom of the diorganosulfur compound and Comparative Example H illustrates the importance of aliphatic unsaturation.

Various modifications and variations will become apparent to those skilled in the art without departing from the spirit and scope of this invention.

We claim:

1. A fluorinated elastomer composition comprising a free-radically curable, fluorinated elastomer gum and an aliphatically unsaturated, diorganosulfur compound in which at least one of the organo groups contains a β,γ-aliphatically unsaturated moiety having at least one hydrogen atom bonded to the α carbon atom of said moiety, said carbon atom being bonded to a sulfur atom of the compound.

2. A composition of claim 1 wherein said diorganosulfur compound has the formula $R^1—S(O)_n—R^2$ wherein n is 0, 1 or 2 and $R^1$ and $R^2$ are organic groups at least one of which contains a β,γ-aliphatically unsaturated moiety having at least one hydrogen atom bonded to the α carbon atom of said moiety, said carbon atom being bonded to the S atom, and $R^1$ and $R^2$ can be covalently bonded to each other to form a heterocyclic ring.

3. A composition of claim 2 wherein said diorganosulfur compound is an aliphatic diorganosulfur compound.

4. A composition of claim 2 wherein said diorganosulfur compound is an aliphatic diorganosulfide.

5. A composition of claim 2 wherein said diorganosulfur compound is an aliphatic diorganosulfoxide or diorganosulfone.

6. A composition of claim 2 wherein said diorganosulfur compound has the structural formula:

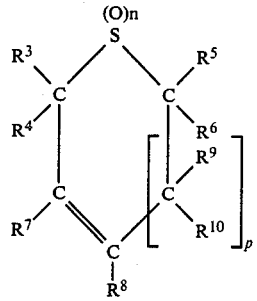

wherein n is 0, 1, or 2, p is 0 or 1, and each R in said structural formula is independently selected from the group consisting of hydrogen or alkyl, at least one of $R^3$, $R^4$, $R^5$ or $R^6$ is a hydrogen atom.

7. A composition of claim 2 wherein said diorganosulfur compound is selected from the group consisting of 2,5-dihydrothiophene-1,1-dioxide, 3-methyl-2,5-dihydrothiophene-1,1-dioxide and 3-ethyl-2,5-dihydrothiophene-1,1-dioxide.

8. A composition of claim 2 wherein said diorganosulfur compound is diallylsulfide.

9. A composition of claim 1 wherein said diorganosulfur compound is present in an amount sufficient to inhibit the scorch of the composition at elevated temperatures.

10. A composition of claim 1 wherein said diorganosulfur compound is present in the amount of 0.05 to 10 percent by weight of said elastomer gum.

11. A curable, fluorinated elastomer comprising a mixture of the composition of claim 1 and a thermally-activatable free-radical curing system.

12. A composition of claim 10 wherein said curing system comprises an organic peroxide.

13. A composition of claim 1 wherein said fluorinated elastomer is a copolymer of fluorinated olefins and a cure-site monomer having a covalently-bonded bromine or iodine atom.

14. A composition of claim 1 wherein said fluorinated elastomer gum is a polymer comprised of repeating units derived from vinylidene fluoride and at least one compound selected from the group consisting of hexafluoropropylene and tetrafluoroethylene.

15. A composition of claim 14 wherein said polymer is further comprised of units derived from a cure-site monomer having a covalently-bonded bromine or iodine atom.

16. A composition of claim 15 wherein said covalently bonded atom is bromine.

17. A composition of claim 14 wherein said polymer is comprised of units derived from vinylidene fluoride, hexafluoropropylene and a copolymerizable cure-site monomer having a covalently-bonded bromine or iodine atom.

18. A composition of claim 16 wherein said polymer further comprises units derived from tetrafluoroethylene.

19. A curable composition comprising a free-radically curable fluorinated elastomer gum, a thermally-activatable organic peroxide curing system, and as a scorch inhibitor an aliphatically unsaturated, diorganosulfur compound in which at least one of the organo moieties contains a $\beta,\gamma$-aliphatically unsaturated moiety having at least one hydrogen atom bonded to the $\alpha$ carbon atom of said moiety, said carbon atom being bonded to a sulfur atom of the compound.

20. A composition of claim 19 wherein said diorganosulfur oxide compound is selected from the group consisting of 2,5-dihydrothiophene-1,1-dioxide, 3-methyl-2,5-dihydrothiophene-1,1-dioxide, and 3-ethyl-2,5-dihydrothiophene-1,1-dioxide.

21. A composition of claim 20 wherein said fluorinated elastomer gum is a polymer comprised of units derived from vinylidene fluoride, hexafluoropropylene, and a bromo- or iodo-containing copolymerizable cure-site monomer.

22. A method of compounding a curable fluorinated elastomer gum composition comprising mixing a free-radically curable fluorinated elastomer gum and an aliphatically unsaturated, diorganosulfur compound in which at least one of the organo moieties contains a $\beta,\gamma$-aliphatically unsaturated moiety having at least one hydrogen atom bonded to the $\alpha$ carbon atom of said moiety, said carbon atom being bonded to a sulfur atom of the compound.

23. A method of forming a cured fluorinated elastomeric article comprising:
   (a) compounding a fluorinated elastomer gum with at least (i) a thermally-activatable free-radical curing system and (ii) a scorch inhibitor comprising an aliphatically unsaturated, diorganosulfur compound in which at least one of the organo moieties contains a $\beta,\gamma$-aliphatically unsaturated moiety having at least one hydrogen atom bonded to the $\alpha$ carbon atom of said moiety, said carbon atom being bonded to a sulfur atom of the compound,
   (b) shaping said composition at an elevated temperature into the form of an article, and
   (c) heating the formed composition to cure said composition.

24. A method of claim 23 wherein said shaping is molding.

25. A method of claim 23 wherein said shaping is extruding.

* * * * *

UNITED STATES PATENT AND TRADEMARK OFFICE
CERTIFICATE OF CORRECTION

PATENT NO. : 4,762,891

DATED : August 9, 1988

INVENTOR(S) : Loren D. Albin and Robert E. Kolb

It is certified that error appears in the above-identified patent and that said Letters Patent is hereby corrected as shown below:

Col. 4, line 37, "30 mol" should read --30 mol %--.

Signed and Sealed this

Sixth Day of June, 1989

Attest:

DONALD J. QUIGG

Attesting Officer

Commissioner of Patents and Trademarks